Figure 1:
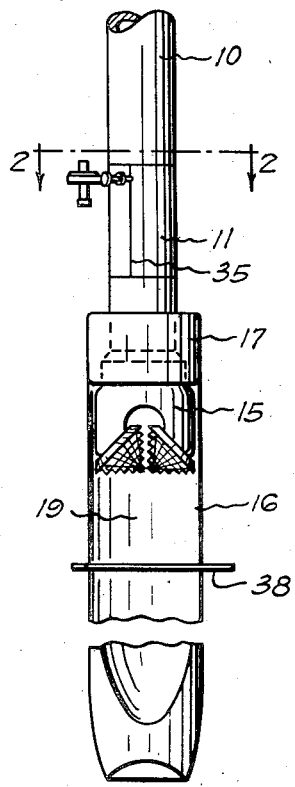

Nov. 16, 1943.   L. C. MILLER   2,334,429
ORIENTING APPARATUS
Filed April 24, 1941   3 Sheets-Sheet 1

Inventor
Leonidas C. Miller

By Jack A. Ethley

Attorney

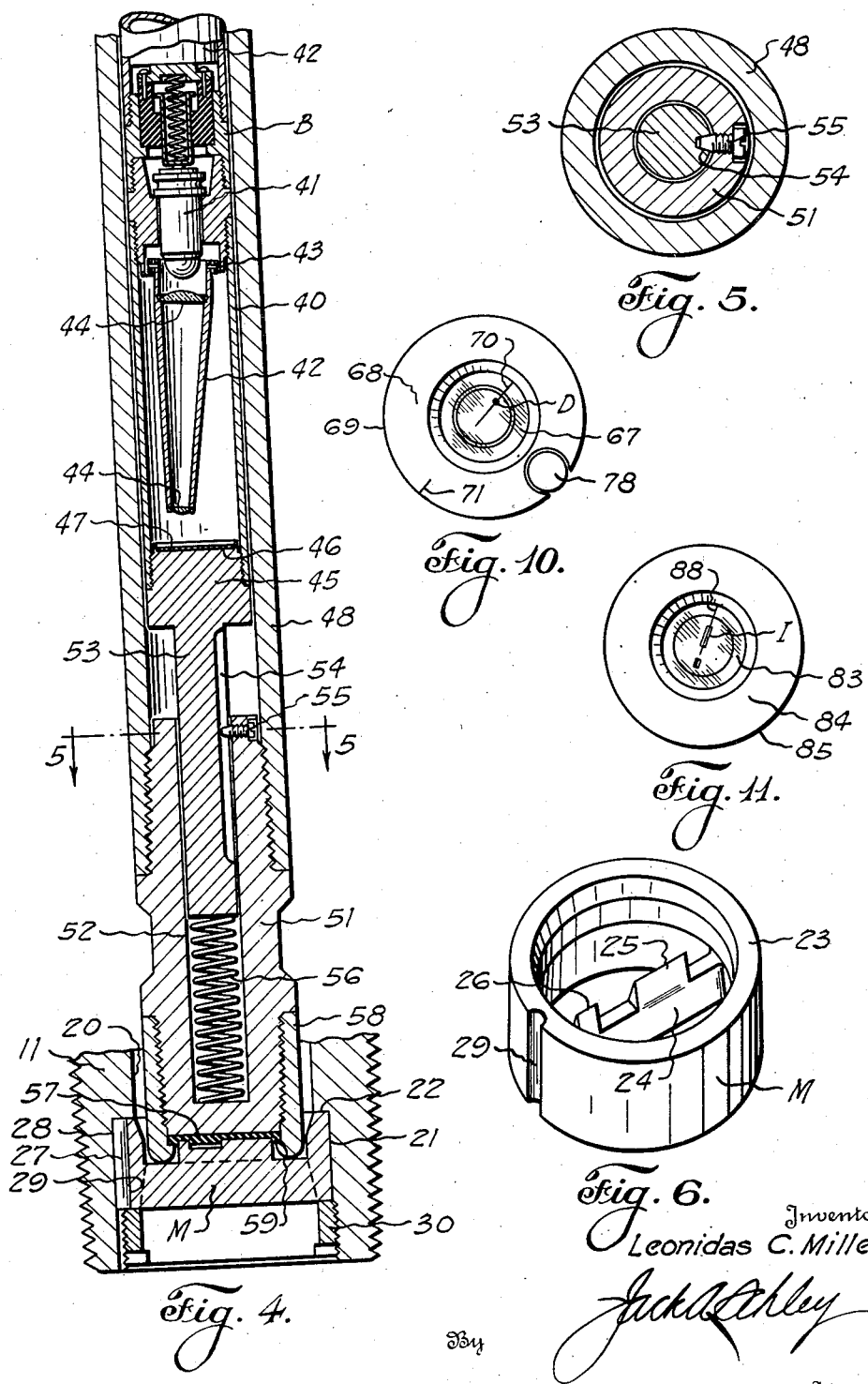

Nov. 16, 1943.  L. C. MILLER  2,334,429
ORIENTING APPARATUS
Filed April 24, 1941  3 Sheets—Sheet 3

Inventor
Leonidas C. Miller
By Jack A. Ehley
Attorney

Patented Nov. 16, 1943

2,334,429

UNITED STATES PATENT OFFICE 2,334,429

ORIENTING APPARATUS

Leonidas C. Miller, Dallas, Tex., assignor of one-half to Eastman Oil Well Survey Company, Dallas, Tex., a corporation of Delaware, and one-half to Eastman Oil Well Survey Corporation, Long Beach, Calif., a corporation of California Application April 24, 1941, Serial No. 390,027

5 Claims. (Cl. 255—1.6)

This invention relates to new and useful improvements in orienting apparatus.

One object of the invention is to provide an improved apparatus for orienting a tool within a well bore, whereby said tool may be located in a predetermined azimuthal position.

An important object of the invention is to provide an improved apparatus for orienting a whipstock, or other tool, within a well bore which apparatus includes means for accurately determining the azimuthal position of the tool within the bore without the necessity of developing a film and also without the necessity of employing magnetic elements for controlling the position of the indicating element of the instrument, whereby the disadvantages and expenses of film and also of magnetic elements is obviated.

A particular object of the invention is to provide an improved apparatus, of the character described wherein an instrument is lowered within the drill stem and is exteriorly marked to indicate its position relative to the tool and at the same time, an indication of the low side of the well bore is made by said instrument, together with an improved reading device for interpreting the azimuthal position of the mark, whereby the exact direction or position of the tool may be ascertained.

A further object of the invention is to provide an improved apparatus, of the character described, wherein a marking element is located in a predetermined known position relative to the tool to be oriented, together with an instrument adapted to be marked by said element and also adapted to make an indication of the azimuthal position of low side of the well bore; the apparatus also including a reading device comprising a plurality of members which are representative of the well tool and drill stem, whereby after the instrument is removed from the well bore, said reading device will immediately and accurately interpret the indications on said instrument to indicate the azimuthal position of the tool.

Another object of the invention is to provide an improved instrument forming part of an orienting apparatus and having means for indicating inclination of a well bore on an indicating element therein, said instrument also having an impression member located exteriorly thereof and secured in a non-rotatable relation to the indicating element, whereby when the element and the impression member are marked, the relation of said markings may be determined after the instrument is brought to the surface.

A still further object of the invention is to provide an improved reading device for use with an orienting apparatus, of the character described, which is so constructed that an immediate and accurate interpretation of the indications of the instrument may be had, whereby the exact azimuthal position of the tool within the well bore may be quickly ascertained.

A particular object of the invention is to provide an improved orienting method which includes, surveying the well bore to determine the direction of inclination of said bore, then lowering a tool to be oriented into the bore, then lowering an instrument having means for making an index on an indicating medium, said index being representative of the low side of the bore, marking the exterior of the instrument, which mark bears a known relation to the tool, and then determining the position of the index relative to the mark to ascertain the azimuthal position of the tool.

The construction designed to carry out the invention will be hereinafter described together with other features of the invention.

Figure 2:
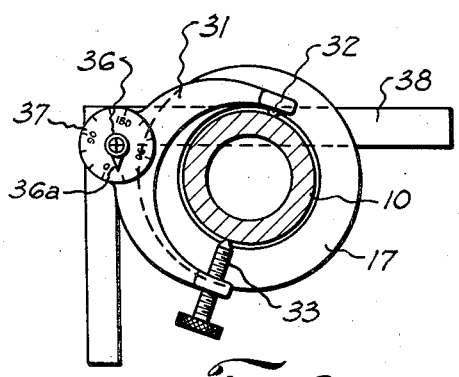
Figure 3:
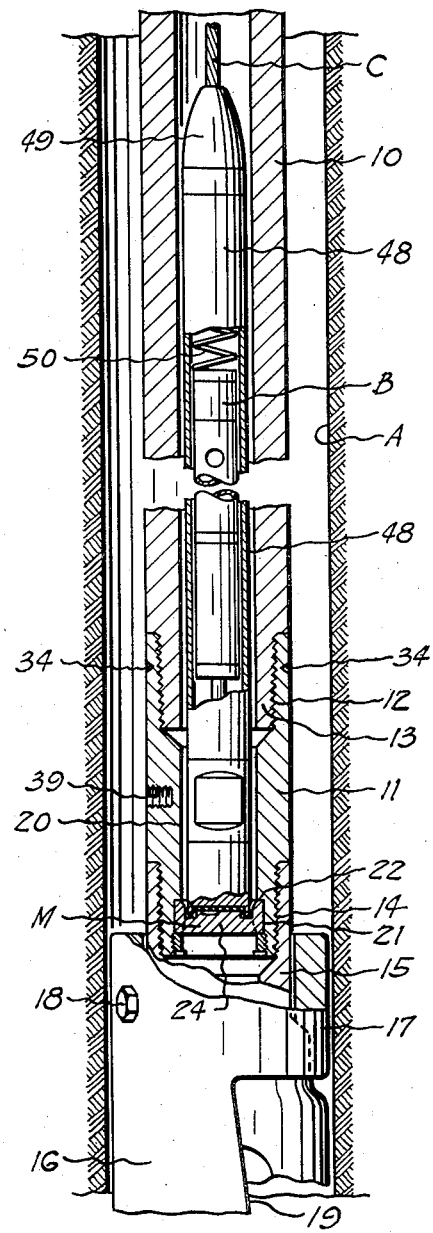
Figure 8:
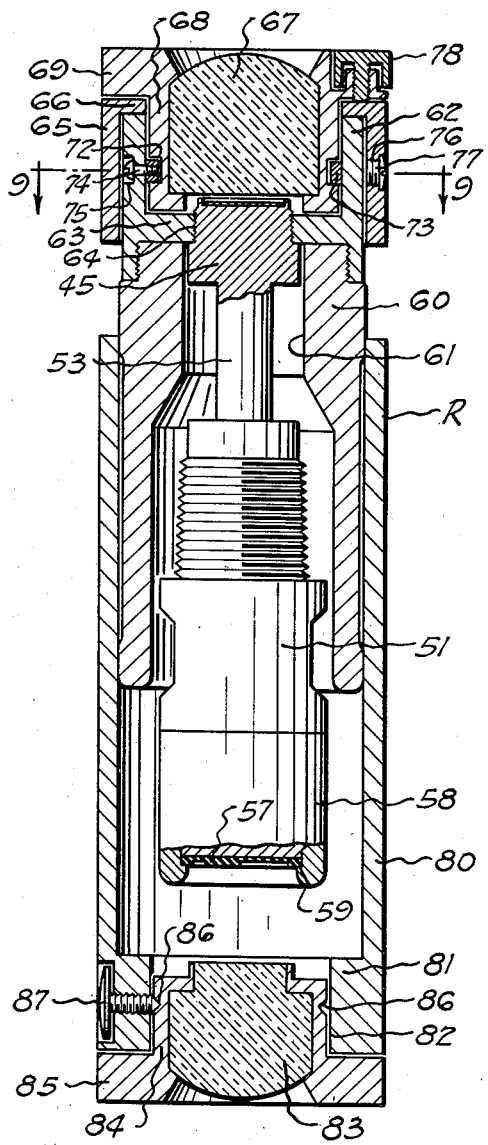
Figure 9:
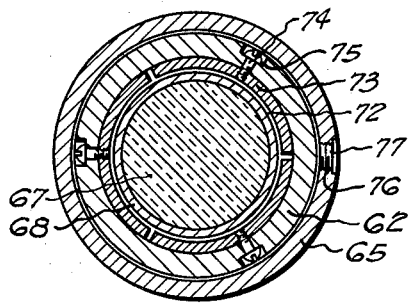
Figure 7:
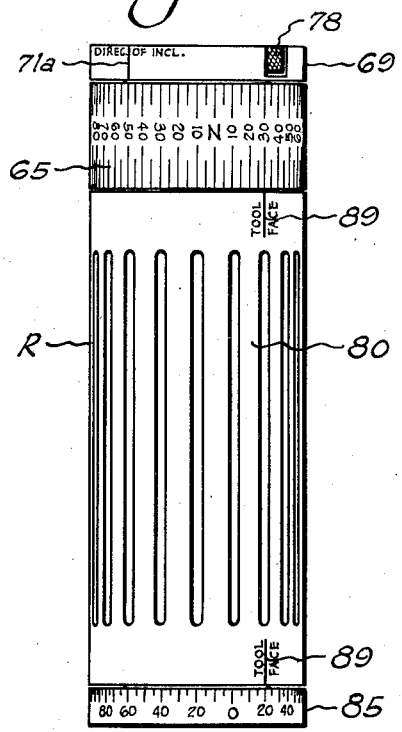

The invention will be more readily understood from a reading of the following specification and by reference to the accompanying drawings, as an example of the invention is shown, and wherein:

Figure 1 is an elevation of the tool to be oriented and showing the same attached to the sub forming a part of the orienting apparatus, constructed in accordance with the invention, Figure 2 is a horizontal, cross-sectional view, taken on the line 2—2 of Figure 1, Figure 3 is an enlarged vertical, sectional view of the lower portion of the drill stem and sub, and showing the inclination-indicating instrument lowered therein, Figure 4 is an enlarged, transverse, vertical sectional view of the instrument, Figure 5 is a horizontal, cross-sectional view, taken on the line 5—5 of Figure 4, Figure 6 is an isometric view of the marking member, Figure 7 is an elevation of the reading device, Figure 8 is an enlarged, transverse, vertical sectional view of said reading device, and showing the indicating element of the instrument in position therein, Figure 9 is a horizontal, cross-sectional view, taken on the line 9—9 of Figure 8, Figure 10 is a plan view of the parts shown in Figure 7, and Figure 11 is a bottom view of the parts shown in Figure 7.

In carrying out the invention, it is first necessary to make a directional survey of the well bore at the point at which the tool is to be set so as to determine the direction of inclination of the hole at such point. This may be done by any suitable instrument, either a gyroscopic or magnetic instrument, and such instrument may be lowered into the well bore on a wire line or cable for the purpose of making the initial survey. An instrument, which is generally known to the trade as a single shot survey instrument, may be employed. By means of the instrument, the degree of inclination or deviation from the vertical, as well as the direction of such inclination, may be determined. For example, the instrument may show that the well bore inclines N. 50 E., or it may show any other readings in accordance with the inclination and direction of the well bore.

After this information is obtained by the initial directional survey of the bore hole by any suitable instrument, the drill stem 10 (Figure 3) is lowered into the well bore A. In carrying out the invention, an elongate, cylindrical sub 11 is threaded onto the lower end of the drill stem 10, said sub being formed with an internally screw-threaded box 12 at its upper end, said box receiving a threaded nipple 13 which is formed on the lower section of the drill stem. The lower end of the sub 11 is reduced and formed with external screw threads 14, whereby the upper end of a drill bit 15 may be secured to said sub. The bit may be of any suitable construction and obviously, the sub 11 is interposed between said bit and the lower end of the drill stem 10.

A whipstock 16, or other tool to be oriented, is provided with a collar 17, which is preferably made integral with its upper end and this collar surrounds the drill bit 15, being secured thereto by means of a shear pin 18. When the drill stem is lowered through the well bore A, it will be obvious that the whipstock, as well as the drill bit, are lowered therewith. A rotation of the drill stem will impart a rotation to the whipstock, whereby said whipstock will be oriented in the well bore in the desired manner. A downward jar on the drill stem will result in the shearing of the pin 18, whereby the drill bit 15, sub 11 and drill stem 10 may move downwardly through the collar 17 of the whipstock and upon such movement, the bit is guided by the angular face 19 of said whipstock. It is noted that this construction, just described, is general practice and forms no part of the present invention.

The sub 11 has an axial bore 20 which is of substantially the same diameter of the bore of the drill stem 10 and the lower portion of the bore 20 is enlarged, as shown at 21, to provide an internal, annular shoulder 22 within the sub. A marking element M is disposed within the lower portion of the sub 11 and includes a collar 23 which is insertable within the lower portion of the bore 20, the upper edge of said collar abutting the internal shoulder 22 (Figure 4). A diametrically extending bar 24, which is preferably made integral with the collar 23, bridges or spans the bore of the sub and this bar is formed with an upstanding knife-edge projection 25. The bar is also provided with a smaller knife-edge lug 26 which extends upwardly therefrom, as is clearly shown in Figure 6. The marking element M is non-rotatably confined within the bore of the sub by means of a pin or key 27 which is insertable within complementary recesses 28 and 29 formed in the wall of the sub and the collar 23, respectively. Downward displacement of the collar 23 is prevented by a retaining ring 30 which is threaded into the extreme lower end of the bore 20 of the sub, whereby the collar 23 is confined between said ring and the shoulder 22.

The diametrically extending marking element M is thus fixed within the bore of the sub 11. When the whipstock 16, or other tool, is secured to the sub by its connection to the drill bit 15, the guide face 19 of said whipstock, will bear a definite relation to the marking element. It would of course, be desirable to locate the face of the whipstock in vertical alinement with the diametrically extending bar 24, whereby the enlarged projection 25 of said bar will lie in the same vertical plane as the face 19 of said whipstock. However, in view of the threaded connection between the drill bit and the sub 11, it would be substantially impossible to always locate the face 19 of said whipstock in the same vertical plane as the projection 25.

After the whipstock has been secured to the drill bit, the mis-alinement or the relation of the face of the whipstock to the projection 25, is determined. This may be done in any of a number of ways, but it is possible to employ an alining clamp 31, as shown in Figure 2. This clamp includes a generally U-shaped body or yoke which is formed with an inwardly projecting lug 32 at the outer end of one of its arms and with a set screw 33 at the outer end of its other arm, the screw being diametrically opposite the lug 32. Diametrically opposed recesses 34 are formed in the exterior surface of the sub and are preferably disposed nearer the upper end thereof. These recesses are in vertical alinement with the ends of the transverse bar 24 of the marking element M and it is preferable that a vertically extending indicating line 35 (Figure 1) be provided on the outer surface of the sub, said line extending downwardly from one of the recesses 34. When the clamp 31 is engaged around the sub, as shown in Figure 2, the lug 32 and the screw 33 are engaged with the recesses 34. Since the recesses are in alinement vertically with the ends of the bar, it is known that the screw and the lug 32 lie in the same vertical plane as said bar 24. The central portion of the body or yoke 31 carries a rotatable telescope 36 and an indicating dial 37. A pointer 36a is secured to the outer shell of the telescope and in alinement with one of a pair of cross hairs within said telescope. After the clamp is in position on the sub, a square 38 is placed on the face 19 of the whipstock and the edge of this square is sighted through the telescope 36, adjusting the cross hair and pointer 36a in alinement therewith. The pointer 36 indicates on the dial 37 the exact number of degrees in angular difference between the marking element M and the face 19 of the whipstock. For purposes of this explanation, it will be assumed that the angular difference is 20 degrees, but obviously, it may be any number of degrees depending upon the manner in which the threads of the drill bit 15 make up on the sub 11.

In order to eliminate any angular difference between the face 19 of the tool and the transversely extending marking element M, it would be possible to fasten the whipstock 15 directly to the body of the sub 11. In such instance, the shear pin 18 would be connected within a threaded recess 39 formed in the exterior of the sub. As illustrated, the recess 39 is in vertical alinement with the transversely extending bar 24 of the marking element M and with the face of the whipstock and when the shear pin is fastened within this recess, the face 19 on the whipstock will be in vertical alinement with the bar 24, there being no angular difference between these parts. If the whipstock or tool is connected to the threaded recess 39, there would be no need to employ the alining clamp 31 to determine an angular difference between the bridging or marking element M and the whipstock face.

From the above, it will be seen that after the sub, drill bit, and tool 16 are assembled as described, the angular difference, if any, between the transversely extending bar 24 and the face 19 of the tool is determined. This is accomplished at the surface prior to lowering of the drill stem into the well bore A. As has been stated, it will be assumed that there is an angular difference between the whipstock face and the marking element M. The drill stem is then lowered into the well bore A so as to locate the sub at substantially the point at which the preliminary survey was made. Of course, at this time, all that is known is the angular relation of the marking element M to the whipstock face 19, and the azimuthal position or direction in which said face is disposed, is not known.

After the assembly, as above described, is lowered into the well bore A, a suitable inclination indicating instrument B is arranged to be lowered by means of a wire line or cable C downwardly through the drill stem and into the bore 20 of the sub. This instrument may be similar to the one which is fully disclosed in my co-pending application filed May 18, 1939, Serial No. 274,329, now Patent No. 2,255,295 of September 9, 1941. The instrument includes an elongate shell 40 which is provided with a light source, such as an electric lamp 41, located intermediate its ends. The lamp is supplied with electrical current by batteries 42 which are housed within the upper portion of the casing 40. Above the batteries, the instrument may have the usual timing mechanism (not shown) for setting up the flow of electrical current to the light source after a predetermined lapse of time. Below the lamp or light source 41, a plumb bob 42 is mounted by means of a Cardan suspension 43, whereby said plumb bob is adapted to undergo universal movement. The plumb bob is tubular, being preferably tapered or reduced toward its lower end and is provided with suitable lenses 44 for focusing or concentrating the light beam passing therethrough. The lower end of the casing 40 is closed by a plug 45 which is threaded into said casing. The upper end of this plug is recessed as shown at 46 and receives an indicating element 47 in the form of a paper disk. The disk is constructed of a light-sensitive paper, such as printing out proof paper which is capable of being exposed or printed out by means of exposure to light.

The instrument B is housed or disposed within an elongate, tubular housing 48 which has a cable socket 49 closing its upper end. The cable C is secured to the socket 49, whereby the housing having the instrument therein may be lowered. A suitable spring 50 may be interposed between the upper end of the instrument B and the upper end of the housing in order to avoid the shock and to protect the instrument during the lowering operation.

The lower end of the housing 48 has the upper end of an elongate coupling 51 threaded therein and this coupling is formed with an axial bore 52. For non-rotatably mounting the instrument casing 40 within the housing 48, the closure or plug 45 which closes the lower end of the casing 40 is formed with an elongate depending stem 53 which extends downwardly into the bore 52 of the coupling 51. The stem is provided with a vertical groove or channel 54 in its exterior wall and a set screw 55 which is threaded radially through the upper end of the coupling 51 has its inner end engaging within this groove or channel. Obviously, this arrangement permits a vertical movement of the instrument casing 40 within the housing 48 but prevents any rotative movement of said instrument within said housing. If desired, a shock absorbing spring 56 may be interposed between the end of the bore 52 and the lower end of the stem 53.

The bottom of the coupling 51 is provided with an impression plate or disk 57, which is constructed of lead or other soft material. The plate is retained in place on the bottom of the coupling by a suitable retaining collar 58 which is threaded onto the coupling and which has an inwardly directed shoulder 59 which engages the periphery of the impression plate. Since the impression plate 57 is secured to the bottom of the casing 48 and also since the instrument B is non-rotatably mounted within the casing, it will be evident that the paper indicating element or disk 47 which is carried by the plug 45 in the lower end of the casing cannot rotate with respect to the impression plate.

The instrument B which is located within the housing 48, as above described, is lowered downwardly through the drill stem 10 to the position shown in Figure 3. The downward movement of the casing 48 is halted by the engagement of the impression plate 57 with the projection 25 and the lug 26 which are formed on the transversely extending bar 24 of marking element M. Manifestly, since the projection 25 and lug 26 are formed with knife-edges, said projection and lug will indent or mark the impression plate 57 as illustrated at I. The instrument remains in this position until the timing mechanism (not shown) of the instrument B is actuated to illuminate the light source or lamp 41. Of course, when the instrument and housing 48 have come to rest, within the drill stem, said instrument and casing will be at the same inclination as said drill stem, which is the inclination of the well bore A. The plumb bob 42, being universally mounted, will remain in a vertical position, whereby its lower end will have swung off center of the indicating element 37 immediately therebelow, the number of degrees between the center of the disk and the position of the lower end of the plumb bob being dependent upon the inclination of the well bore. Due to gravity, the lower end of the plumb bob will swing toward the low side of the well bore and when the light source 41 is illuminated, a beam of light will be projected downwardly onto the paper indicating disk 47. The light beam will expose or print out that portion of the paper which it is striking, with the result that a single dot D will be formed on the paper disk 47. This dot will be representative of the direction of the low side of the hole and the number of degrees which said dot is off center of the disk will indicate the number of degrees of inclination of the well bore. Since the paper disk 47 is non-rotatable and is therefore fixed with respect to the impression plate 57, it will be obvious that the dot D will bear a definite relationship to the diametrically extending indentations I, which have been formed within the impression plate 57 by the projection 25 and the lug 26.

After the instrument B has been operated, the instrument and the housing 48 within which said instrument is located, is removed from the drill stem. At this time, the impression plate 57 has the diametrically extending indentations I which have been formed by the projection 25 and the lug 26. Also, a dot or mark D has been formed on the paper indicating disk 47. As explained, the knife-edge projection 25 and the lug 26 bear a definite known relation to the face 19 of the well tool and therefore, when the housing 48 was within the drill stem, said housing bore a definite relation to the face of the whipstock, such relation being indicated by the diametrically extending indentations I. The indentations I on the impression plate 57 also bear a definite relation to the paper disk 47 on which the mark D has been formed, such mark representing the low side of the well bore. At the surface, the coupling 51 is removed from the lower end of the housing 48, whereby the instrument B may be readily removed from said housing. After this is done, the plug 45 is unscrewed from the lower end of the instrument casing 40, whereby said plug and the coupling 51 attached thereto through the stem 53 may be entirely separated from the instrument. Since the plug 45 is non-rotatable with relation to the coupling 51, it will be manifest that the relative positions of the transversely extending indentations I on the impression plate and the dot D of the indicating disk remain the same. The plug 45 and coupling 51 are then insertable within a reading device R, which is clearly shown in Figures 7 to 11. This reading device provides a means for interpreting the angular relationship between the mark D and the indentations I to determine the azimuthal position of said indentations. When this information is obtained, the azimuthal position of the marking element M which has formed the indentations may be ascertained and from this, the azimuthal position of the face 19 of the whipstock may be determined.

The reading device R (Figure 8) includes a tubular body 60 which is formed with an axial bore 61, the upper end of which is reduced. A supporting collar 62 is threaded onto the upper end of the body 60 and has a transverse partition or plate 63 formed integral therewith and extending across its bore nearer the lower end of the collar. An axial screw-threaded opening 64 is provided in the plate or partition 63, said opening being slightly less than the diameter of the upper end of the bore 61 of the body. When the collar 62 is in position on the body, the underside of the plate or partition engages the upper edge of said body. An annular graduated dial element 65 having the points of the compass marked off in degrees thereon, is rotatably mounted on the collar 62, said dial being provided with an inwardly directed overhanging flange 66 which overhangs the upper edge of the collar 62. Manifestly, the dial 65 may be rotated around the collar 62 and with relation to the body 60. A circular lens or transparent window 67 is mounted within an annular lens carrier 68 which is insertable within the collar 62. The lens carrier is formed with an outwardly directed annular flange 69 which overlies the inwardly directed flange 66 of the dial. The lens 67 is provided with a diametrically extending indicating line 70 which extends substantially from the center of the lens to the outer periphery thereof. 180 degrees opposite the outer end of the indicating line 70 is an indicating mark 71, which is formed on the upper edge of the flange 69 of the lens carrier. This mark may be extended downwardly as shown at 71a on the periphery of the flange, whereby said mark may be readily alined with the indications on the dial 65.

For rotatably confining the carrier 68 within the collar 62, an annular groove or recess 72 is provided in the outer surface of the carrier nearer the lower end thereof. A plurality of retaining shoes 73 are disposed within the groove 72, said shoes being fastened to the collar by means of suitable screws 74. The outer end of each opening which receives the screws 74 is countersunk as illustrated at 75, whereby the head of each screw is below the plane of the outer periphery of the collar 62. For facilitating the insertion and removal of the screws 74 so as to permit assembly and dis-assembly of the device, an enlarged opening 76 extends through the annular dial element and is normally closed by a threaded plug 77. For locking the carrier 68 within the collar 62 and also for locking the dial element 65 against rotation on said collar, a locking screw 78 is threaded through the flange 69 of the carrier and has its lower end adapted to engage the upper surface of the flange 66 of the dial. When the screw 78 is tightened against the flange 66, the carrier 68 is drawn upwardly against the retaining shoes 73 to frictionally lock said carrier against rotation. At the same time, the frictional engagement of the screw 78 with the flange 66 will frictionally lock the compass dial 65 against rotation on the collar 62.

When the plug 45 is removed from the instrument casing 40, as has been explained, said plug is inserted within the bore of the body 60 and the plug is threaded into the opening 64 in the partition 63 below the lens or window 67. Since the plug 45 carries the paper indicating disk which has the dot D imprinted thereon, it will be obvious that said dot will be clearly visible through the lens. The coupling 51 which is connected to the plug 45 through the stem 53 extends outwardly from the lower end of the bore 61 of the body 60, as is clearly shown in Figure 8.

The dot or mark D on the disk 47 is representative of the low side of the well bore and in adjusting the reading device, the lens carrier 68 is rotated so as to aline the indicating line 70 with the dot D, as is clearly shown in Figure 10. When this is done, it is known that the outer end of the indicating line 70 indicates the low side of the well bore and thus, the indicating mark 71 on the flange 69 of the carrier 68, which is 180 degrees opposite the end of the line 70, represents the high side of the well bore or the direction in which the well bore is inclining. As has been explained, a preliminary survey was made prior to the lowering of the instrument B through the drill stem and the direction of inclination of the well bore is known. Assuming this direction to be N. 50 E., then the compass dial element 65 is rotated on the collar 62 so as to aline the reading "N. 50 E." with the indicating mark 71 which is representative of the high side of the hole. After this adjustment is made, the locking screw 78 is tightened downwardly against the flange 66 of the dial element, whereby the dial and the lens carrier 68 are locked against rotation relative to the collar 62.

After proper adjustment of the dial element 65 has been accomplished, as above described, an elongate shell 80 is engaged over the body 60, the inner diameter of this shell being substantially equal to the exterior diameter of said body, whereby a relatively tight fit of the shell on the body is had. The shell is slipped upwardly on the body 60 so that its upper edge is adjacent or contiguous to the lower edge of the compass dial element 65. An internal flange or shoulder 81 is formed within the lower end of the shell, whereby the extreme lower end of the bore of said shell is reduced as indicated at 82. A lens 83 or transparent window which is carried by a lens carrier 84 is rotatably mounted within this reduced portion 82 of the bore. The carrier is formed with an outwardly directed annular flange 85 which is contiguous to the lower edge of the shell. The carrier is formed with an annular recess 86 in its outer periphery and a retaining and locking screw 87 which is threaded through the wall of the shell has its inner end engaging within the recess. Manifestly, the screw retains the lens carrier 84 rotatably within the bore 82; upon tightening of the screw 87, the lens carrier may be locked against rotation within said bore.

The lens 83 is provided with a diametrically extending indicating line 88, which line extends substantially from the center of the lens to the outer periphery thereof. This line is representative of the transversely extending bar 24 of the marking element M and the lens is rotated so as to aline the indicating line 88 with the indentation I previously formed by the knife-edge projection 25 of the marking element M, as is clearly shown in Figure 11.

As has been previously explained, the angular relation between the knife-edge projection 25 of the marking element with respect to the face 19 of the whipstock, was determined prior to lowering of the assembly into the well bore. In order to compensate for this angular difference, the exterior of the shell 80 is provided with indicating lines 89 (Figure 7), which lines are representative of the face 19 of the tool. The periphery of the flange 85 of the lens carrier is marked off in degrees and the zero mark on the periphery is in radial alinement with the outer end of the indicating line 88. The shell 80 is rotated so as to offset its indicating line 89 relative to the zero point, such offsetting being in accordance with the previous determination of the angular difference between the projection 25 and the tool face. As shown in Figure 7, this angular difference is 20 degrees and after this adjustment has been made, the locking screw 87 is tightened to lock the lens carrier 84 relative to the shell 80.

The shell 80 is thus representative of the tool and the lower indicating line 89 which is adjacent the flange 85 of the lower lens carrier is in vertical alinement with the indicating line 89 on the shell which is adjacent the dial element. After the shell has been adjusted relative to the zero mark so as to compensate for the angular difference between the position of the projection and the tool face, the entire shell is rotated so as to aline the indicating line 88 on the lower lens with the indentation I which is representative of the projection 25. After this adjustment is made, it is only necessary to read the compass dial opposite the upper line 89 to obtain the azimuthal position of the face 19 of the tool.

In the operation of the apparatus, a preliminary survey of the well bore A is first made in order to determine the direction of the inclination of the well bore at the point at which the tool is to be set. After this preliminary information is obtained, the drill stem is assembled with the sub 11, drill bit 15 and whipstock 16. By means of the alining clamp shown in Figures 1 and 2, the angular difference between the position of the knife-edge projection 25 of the marking element M and the face 19 of the whipstock is determined. The drill stem is then lowered downwardly in the well bore to locate the tool 16 at the proper point.

After this is done, the instrument B which is mounted within the housing 48 is then lowered downwardly through the drill stem so that the impression plate 57 on the coupling 51 which is connected to the lower end of the housing 48 strikes the marking element M. The engagement of the impression plate with the knife-edge projections 25 and 26 causes the indentations I to be formed on said plate. Obviously, the instrument B will assume an inclination in accordance with the inclination of the well bore A but the plumb bob 42, due to its universal mounting, will remain in a substantially true, vertical position, whereby its lower end will be offset toward the lower side of the hole relative to the indicating paper disk 47. After a predetermined length of time, the light source 41 within the instrument B is illuminated to direct a beam of light downwardly onto the indicating element 47 and thereby develop or print out a portion of said disk, whereby the dot D is formed on said element. The element 47 is at all times non-rotatable with relation to the impression plate 57, whereby a definite relation between the indentations I and the dot D is maintained.

After the instrument is operated, it is removed from the drill stem and brought to the surface. The coupling 51 is removed from the housing 48 and then the plug 45 is removed from the casing 40 of the instrument B. These parts are then inserted within the body 60 of the reading device R, as is clearly shown in Figure 8. The plug 45 is threaded into the opening 64 immediately below the upper lens 67, whereby the dot or mark D on the disk 47 carried by the plug 45 is clearly visible through the lens. The lens is then adjusted as shown in Figure 10 so that the indicating line 70 is alined with the dot D. This dot being representative of the low side of the hole, it is obvious that the mark 71 which is 180 degrees opposite the outer end of the line 70 is representative of the high side of the hole, or the direction in which the well bore inclines. After the lens is adjusted, the compass dial element 65 is rotated relative thereto so that the proper reading on the dial is opposite the high side or mark 71. The adjustment of the dial element is, of course, controlled by the information obtained by the preliminary survey. After the dial element and lens 67 are properly adjusted, the locking screw 78 is tightened to lock these parts in their adjusted position.

When the plug 45 is inserted within the opening 64, the coupling 51 which is attached to the plug and which carries the impression plate 57, extends from the lower end of the bore 61 of the body 60. This impression plate carries the indentations I which are representative of the projections 25 and 26 of the marking element. The shell 80, which is representative of the tool or whipstock 16 is then slid upwardly over the body 60. As explained, this shell carries marks 89 which are representative of the tool face 19 of said whipstock. The lower end of the shell has a lens 83 mounted therein and this lens has an indicating line 88 which is representative of the projections 25 and 26. As explained, the shell 80 is adjusted with relation to the degree markings on the flange 85 of the lens carrier, whereby the angular difference between the tool face and the projection 25 is compensated, the screw 87 is then tightened to lock the lens in position relative to the shell. This adjustment is preferably made before the shell is slid onto the body. After the shell is engaged over the body 60, the lens 83 is then adjusted so as to aline its indicating line 88 with the enlarged indentation I which is representative of the projection 25. After this adjustment is made, it is obvious that the upper line 89 on the shell 80 is opposite some reading on the dial 65. This reading indicates the exact position of the tool face 19 of the whipstock.

After the reading is determined, it is obvious that the drill pipe 10 may be rotated to properly locate the face 19 in a desired azimuthal position. It will be obvious that the method is simple and accurate. The use of the printing out paper disk 47 eliminates the necessity of the development of any film and therefore, an immediate and accurate reading may be had. The use of the impression plate 57 which is marked by the projections 25 and 26 eliminates the use of any magnetic means within the sub or drill stem. The reading device obviates the necessity of any calculation since the dial gives an accurate visual indication of the exact azimuthal position of the tool. It is noted that the reading device simulates the various elements which are located within the well bore, and thus when said device is adjusted, the position of the various elements is visually illustrated. It is noted that if the whipstock or tool 16 is connected to the sub 11 at the threaded opening 39 which is in alinement with the projection 25, it would not be necessary to adjust the lens 83 at the lower end of the shell with respect to said shell. In such instance, the line 89 which is representative of the tool face would merely be located opposite the zero indication on the dial of the flange 85 of the lower lens carrier 84.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A well surveying instrument including, an outer shell, an instrument casing within the shell, a support removably mounted in the lower end of the casing and depending therefrom, an indicating medium carried by the upper end of the support, means within the instrument casing for marking the medium to indicate the low side of a well bore, a closure closing the lower end of the shell, means for connecting the closure with the support so that said closure is non-rotatable relative to the support, and an impression element on the bottom of said closure, said closure and support being removable from the shell and instrument casing as a unit.

2. A well surveying instrument including, a casing, a support removably secured in and closing the lower end of the casing, an indicating medium carried by the support and disposed within the casing, means within the casing for marking the medium to indicate the low side of the inclination of the casing, an extension depending from the support, a coupling non-rotatably connected with the extension, and an impression member mounted on the lower end of the coupling and bearing a fixed relation to the support and medium carried by said support.

3. An instrument as set forth in claim 2, wherein the connection between the extension and coupling permits relative axial movement of these parts while preventing relative rotation.

4. A surveying instrument as set forth in claim 1, wherein the indicating medium is a light-sensitive paper disk and the marking means is a light beam and a tubular plumb bob through which the beam is directed onto the disk to mark the same.

5. A well surveying instrument including, a casing, a support removably secured in and closing the lower end of the casing, an indicating medium carried by the support and disposed within the casing, means within the casing for marking the medium to indicate the low side of the inclination of the casing, and an impression member disposed exteriorly of the casing and having a non-rotatable connection with the support whereby said impression member is held in a predetermined position relative to the support and to the mark formed on the medium mounted in said support, said indicating medium comprising a light sensitive paper disk and said marking means being a light beam and a tubular plumb bob through which the beam is directed onto the disk to mark the same.

LEONIDAS C. MILLER.